United States Patent [19]
Baumoel

[11] 3,869,915
[45] Mar. 11, 1975

[54] DIGITAL FLOWMETER

[76] Inventor: Joseph Baumoel, 107 Columbia Dr., Jericho, N.Y. 11753

[22] Filed: Jan. 23, 1973

[21] Appl. No.: 326,089

[52] U.S. Cl. ............................................. 73/194 A
[51] Int. Cl. ............................................. G01f 1/00
[58] Field of Search ................................. 73/194 A

[56] References Cited
UNITED STATES PATENTS

| | | | |
|---|---|---|---|
| 3,237,453 | 3/1966 | Yamamoto et al. | 73/194 A |
| 3,327,806 | 6/1967 | Anderson | 73/194 A UX |
| 3,329,017 | 7/1967 | Yamamoto et al. | 73/194 A |
| 3,522,580 | 8/1970 | Lynch et al. | 73/194 A UX |
| 3,555,899 | 1/1971 | Yamamoto et al. | 73/194 A |
| 3,653,259 | 4/1972 | McShane | 73/194 A |
| 3,710,621 | 1/1973 | Asada | 73/194 A |
| 3,729,993 | 5/1973 | Eck et al. | 73/181 |
| 3,731,532 | 5/1973 | Courty | 73/194 A |

*Primary Examiner*—Charles A. Ruehl
*Attorney, Agent, or Firm*—Ostrolenk, Faber, Gerb & Soffen

[57] ABSTRACT

A digital flowmeter provides axially spaced transducers clamped on the exterior of a fluid conducting conduit. Sonic energy from the first transducer is applied through the pipe and into the medium and the time taken to reach the second transducer is counted. Sonic energy is then sent from the second transducer, through the medium, to the first transducer and the time taken to reach the first transducer is counted and subtracted from the first time. This difference is then displayed as a function of flow.

13 Claims, 13 Drawing Figures

PATENTED MAR 11 1975 3,869,915
SHEET 1 OF 3
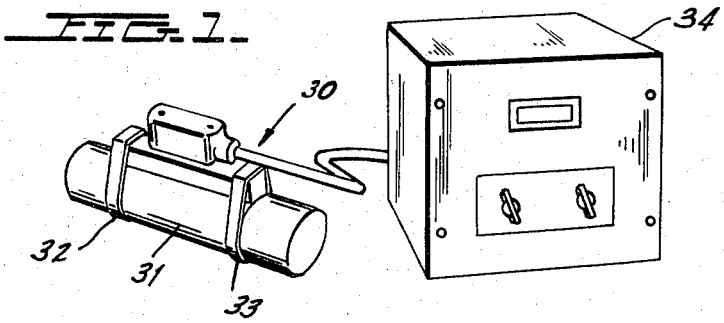
FIG. 1.
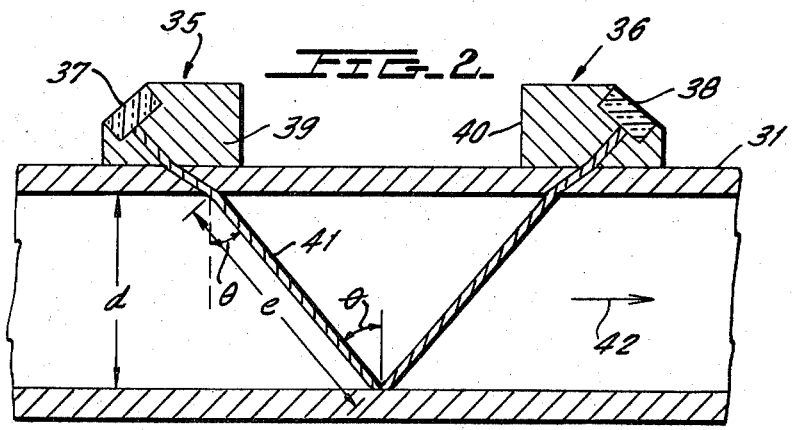
FIG. 2.
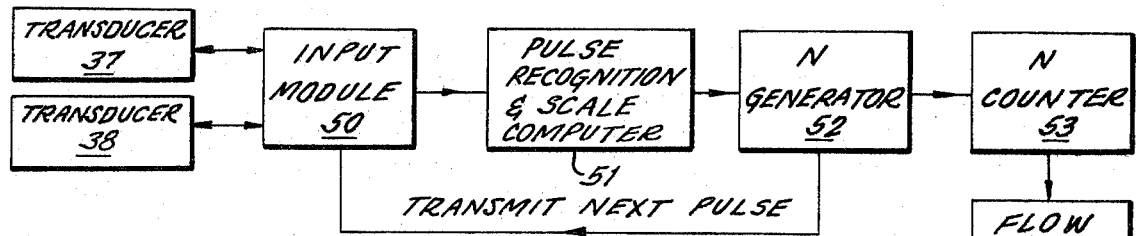
FIG. 3.
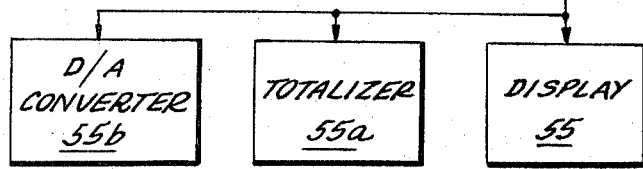
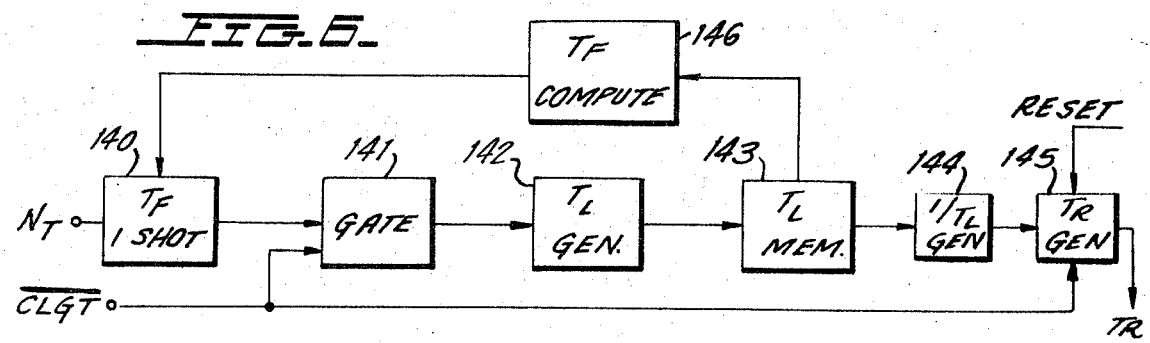
FIG. 6.

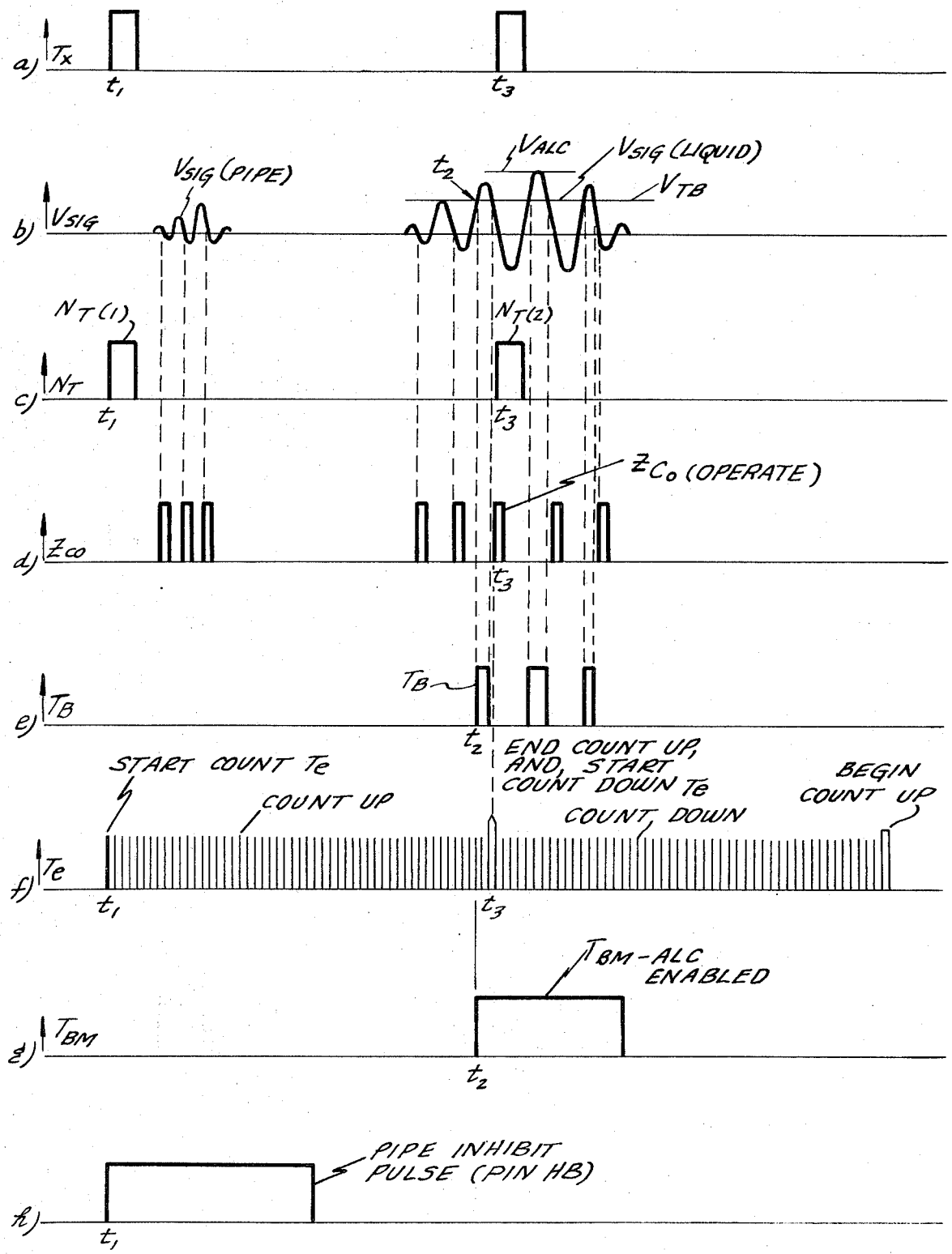

DIGITAL FLOWMETER

BACKGROUND OF THE INVENTION

This invention relates to flowmeters, and more specifically relates to a novel flowmeter which employs transducer means for passing ultrasonic sound pulses into a pipe and processing circuitry to process the reflected energy of these sound pulses to produce a display of flow rate.

Flowmeters for monitoring the flow of fluid in a conduit are well known, and commonly require mechanical devices which are inside the pipe and which are mechanically activated by the flow of liquid in the pipe. Installation and maintenance of such devices requires shutdown of the system being monitored, and cutting into the pipes. Moreover, each device must be individually mechanically aligned and calibrated. These operations are further complicated when dealing with corrosive or sanitary liquids.

BRIEF SUMMARY OF THE INVENTION

In accordance with the present invention, a novel flowmeter is provided which contains spaced transducers which are clamped to the exterior surface of a pipe and are spaced along the pipe axis. These transducers then alternately transmit and receive ultrasonic energy through the liquid in both the upstream and downstream directions. The difference in time required for the sound energy to travel upstream and downstream is then measured by novel circuit means and is displayed in terms of flow rate.

Since the transducers are simply clamped onto the pipe, installation downtime on existing pipelines is completely avoided. Moreover, flow is not obstructed by the instrument, and the unit can be used in connection with highly corrosive or sterile fluids since there is no contact between the transducer and liquid.

As will be seen later, the unit is self-calibrating and operates independently of the composition of the fluid being monitored. Thus, the unit can be installed and used by nontechnical personnel.

If desired, the structure can be used with little circuit modification for purposes other than as a flowmeter. By way of example, the concepts of the present invention are applicable to uses as a liquid interface detector; a flow switch; a high or low level control and alarm; as a full — not full pipe sensor; as a means of identifying the type of liquid in the pipe; and of controlling the mix ratio of liquids.

In carrying out one aspect of the inventive concept, a first transducer will apply a pulse of ultrasonic energy, say in the upstream direction of fluid flow, and the time taken for a given point of the signal received by the second transducer is counted by a counter which counts the number of pulses produced by a high frequency clock generator which runs during this transmission time. The second transducer will then send a pulse of ultrasonic energy in the downstream direction and the counter, connected to the clock generator, counts down until the given point in the return signal received by the first transducer. The net count remaining in the counter is then a function of the difference in time required for sound energy to go upstream or downstream which, in turn, depends on fluid flow velocity.

In carrying out the above concept, it was recognized that, using reasonable clock frequencies, the count difference in a single up-down sequence will be small, and it would be difficult to accurately measure small changes in flow velocity. Thus, in practice, a relatively large number of up cycles are produced, followed by a correspondingly relatively large number of down cycles, to form a single count cycle. In this way, it is possible to increase the count difference during one group of up and down cycles (a count cycle) to increase the measurement accuracy. At the same time, the total number of up cycles and down cycles in a read cycle are automatically selected to be within a given range to ensure that one read cycle will not be so long that the up and down measurements will be unequally affected by flow velocity changes.

A further important aspect of the invention is to ensure that time measurement for all up and down cycles is made at the same point in the return signal. This is complicated by the fact that the return is a complex signal which varies from instant to instant. In accordance with one aspect of the invention, it was recognized that while the return signal is complex, the zero crossover points in the signal remain fairly stable. Moreover, it was found that by suitably choosing the transmit frequency, the zero crossover points in the return signal are substantially farther apart in time than the maximum theoretical variation in time due to maximum change in fluid flow for a signal to be transmitted between transducers. Accordingly, it was found that the received signal level could be normalized and the receiver circuits gated open when a given instantaneous signal level was reached. The presence of the very next voltage zero in the return pattern is then marked as the point at which the time measurement is made. The time taken from the transmission time of a pulse to the time the necessary signal level is reached to gate the receivers open to record the next current zero is memorized for the first of a group of updown cycles which form a read cycle. Thereafter, the receiving circuits for succeeding up-down cycles of the read cycle are gated open only after this memorized length of time is counted. Thus, the first cycle of each read cycle establishes a fixed gating time to be used for counting in each up and down cycle of the read cycle, and time is measured in each cycle with the reception of the next signal voltage zero. In this way, the system is made independent of amplitude changes in the return signal.

BRIEF DESCRIPTION OF THE DRAWINGS

FIG. 1 shows a transducer assembly of the invention clamped onto a pipe, and further shows the electronics housing connected to the transducer.

FIG. 2 is a cross-sectional view of the pipe of FIG. 1, and schematically shows the spaced elements of the transducer assembly and a typical, ultrasonic ray trace.

FIG. 3 is a functional block diagram of the system of the invention.

FIGS. 5a and 5h are diagrams on a common time base illustrating the operation of the circuit of FIG. 4.

FIG. 6 is a block diagram of a $T_R$ generator which could be used in FIG. 4.

DETAILED DESCRIPTION OF THE DRAWINGS

Figure 4:
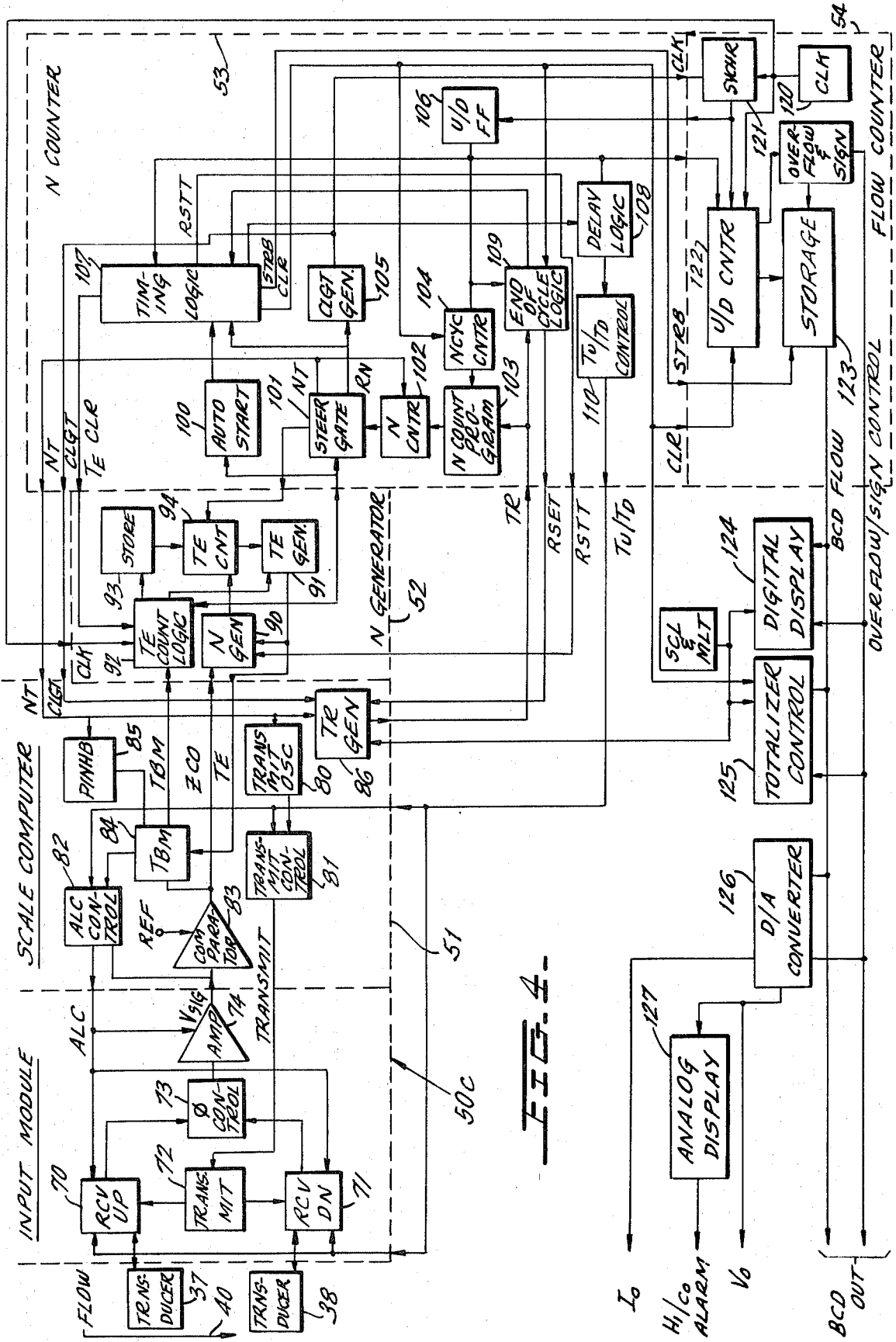
FIG. 4 is a detailed block diagram of the novel flow computer structure of the invention.

FIG. 1 schematically shows an installation using the novel invention wherein a transducer assembly 30 is simply clamped onto a conduit or pipe 31 in order to detect flow or presence of liquid in the conduit 31. Conduit 31 may be metal, plastic or cement lined and may have any diameter, typically from one-half inch to 60 inches. Simple pipe straps 32 and 33 are used to clamp transducer 30 to pipe 31. The output of transducer 30 is connected to measuring and indicating circuits contained within housing 34, which provides a digital display of the flow of liquid in conduit 31, for example, in gallons per minute or per hour. Indicating devices in housing 34 may also indicate total flow over a given period of time. As will be seen later, an analog display could also be provided. The control circuitry in housing 34 could be adapted for use as a flow switch, or as a liquid level indicator, or as a device to detect a liquid interface between two liquids flowing in the pipe. It is to be noted that there is no need to enter the pipe 31 to make the desired measurement, and that the transducer 30 is simply clamped onto the outside of the pipe 31.

FIG. 2 is a cross-sectional view through pipe 31 and schematically illustrates the transducer assembly 30 as including spaced transducers 35 and 36. Each of transducers 35 and 36 consist of flat piezoelectric crystals 37 and 38 suitably secured in holders 39 and 40, respectively, which are mechanically clamped to the outside of pipe 31. The spacing and angle of transducers 37 and 38 relative to the axis of pipe 31 and the wavelength of the sound energy are chosen to insure that sound energy will pass through the pipe wall and into the liquid within pipe 31, and is reflected back through the pipe wall to the other transducer. Transducers 37 and 38 may be spaced by about 2½ times the pipe diameter.

In accordance with one aspect of the invention, the faces of transducers 37 and 38 form an angle of between 50° to 60° relative to the axis of the pipe 31. This allows application of a given transducer structure to a wide range of pipe structures while obtaining sufficient energy return to a transducer for virtually any fluid. The sound frequency chosen could be between about 40 kilohertz and 1 megahertz to give a good compromise for pipes having thin or thick wall sections of various diameters. It is preferable that the pipe thickness should be small relative to the wavelength of the sound energy used. A frequency between the above limits gives good results for most pipe wall thicknesses which are encountered in practice. The thickness and diameter of transducers 37 and 38 are chosen to give a suitable beam width so that there will be sufficient energy transmitted to the receiving transducer during the device operation regardless of changes in angles of refraction due to different liquids having different characteristic sound velocities and pipe wall materials.

In the arrangement of FIg. 2, there is shown a ray 41 of sound energy transmitted, for example, by transducer 37. The ray 41 is refracted away from the normal when it enters the wall of pipe 31 and toward the normal when it passes into the liquid in pipe 31. Note that this liquid is presumed to be flowing in the direction of arrow 42. The ray 41 strikes the opposite side of pipe 31 at an angle $\theta$ to the normal, and is reflected back toward transducer housing 40. Ray 41 then reenters and is refracted by the pipe wall and enters and is refracted by housing 40 and is finally received by transducer 38. Following receipt of this impulse (in practice, following receipt of a plurality of "up" cycles), transducer 38 transmits an energy pulse which again follows the path of ray 41, but in an opposite direction, with this energy ultimately being received by transducer 37. In practice, a plurality of down cycles are created, forming, with the up cycles, a total count cycle. Since the energy transmitted from transducer 37 goes downstream with the flow 42, it will be received by transducer 38 in a shorter time than energy from transducer 38, going upstream of flow 42, will be received by transducer 37. This time difference will be related to the flow rate of flow 42.

The present invention provides novel means for measuring and displaying this time difference and thus the flow rate. Alternately, the presence of a fluid or the type of fluid in the pipe 31 can be discerned by changes in transit time of sonic energy between transducers 37 and 38 and these conditions can be indicated or displayed.

In the preferred embodiment of the invention, the time taken for the sound pulse to travel from one transducer to the other is measured by counting the number of pulses of a clock pulse generator which are produced during pulse transit time. In particular, these pulses are counted up when the pulse travels from a first transducer and are counted down when the pulse travels toward the first transducer. The pulse number difference for one round trip will then be related to the flow rate of the liquid medium.

In accordance with one aspect of the invention, and to increase the counting accuracy, a plurality of upstream pulses an an equal plurality of downstream pulses are used for one count cycle. That is, the time difference for only one round trip or cycle is so small that its reading would be difficult. For example, in the case of a flow of water at 10' per second, the difference in time for a pulse to travel upstream is only about 0.2% of the time taken to travel downstream. This difference would be hard to measure accurately, especially with pulse measurement techniques. By reading the time difference after a large but equal number of up and downstream cycles, the time difference or residual pulses in an up-down counter are sufficiently large to give an accurate measure of flow. As will be later described, the total number of count cycles in a given read cycle can be chosen to be between 128 and 512 for good reading accuracy.

The flow readout in the apparatus of the invention can be shown to be represented by the following equation:

$$F = mf_c \, (v_m/v_s) \sin \theta \, T_R$$

(1)

where $F$ is the digitized flow in pipe 31 of FIG. 2 in arbitrary flow units;

$m$ is a constant;

$f_c$ is the counting clock frequency;

$v_m$ is the flow velocity of flow 42;

$v_s$ is the velocity of sound in the fluid medium in pipe 31;

$\theta$ is the reflection angle shown in FIG. 2;

$T_R$ is the total effective read time during which the sound energy traverses from the transmitting transducer 37 or 38 to the other and receiving transducer.

It can be seen from the above that the flow readout F will change with fluids having a different $v_s$ so that it would appear necessary to recalibrate the measurement when different fluids are monitored. However, in accordance with one aspect of the invention, very accurate automatic compensation can be obtained by making $T_R$ proportional to $1/T_L$ which is, in turn, proportional to $v_s$
where $T_L$ is the time taken for sound to travel the distance $e$ in FIG. 2. It can be seen that $$T_L = e/v_s = (d/v_s \cos \theta (\text{pipe diameter}))$$

By making $T_R$ proportional to $v_s$, equation (1) above becomes:

$$F = mf_c\ v_m/v_s \sin \theta\ [v_s \cos \theta/d]$$

which reduces to:

$$F = mf_c\ v_m/d \sin \theta \cos \theta \quad (2)$$

Equation (2) shows that the flow readout from the instrument of the invention is made independent of the velocity of sound in the particular medium if the time $T_R$ is made proportional to $v_s$. Thus no manual calibration is necessary because of the nature of the fluid being monitored, if control circuits cause $T_R$ to be inversely proportional to $I_L$ and proportional to $v_s$. A circuit of this kind is shown in FIG. 6 which will be later described.

As a practical matter, there will be a small scaling error because $\theta$ will change with different fluids having a different $v_s$, therefore creating a different refraction pattern. By way of example, $\theta$ will vary from about 40° to about 52° for liquids having $v_s$ of 900 to 1900 meters per second, respectively. It can be shown that if a nominal angle $\theta$ is chosen for water at about 48°, the entire system will remain within about ± 0.5% accurate for liquids whose diffraction angles lie between 41° and 49°. The system can be shown to remain within about 1.5% for liquids whose diffraction angles lie between 39° to 51°.

Further compensation can be provided, if desired, for example, by adding a linear compensation circuit which operates on the output of $T_L$ for liquids having a $v_s$ less than those giving a refractory angle of 39° so that a maximum 1.0% error can be retained down to angles of 29°. As a practical matter, however, compensation to a minimum of about 39° will fulfill most commercial requirements.

FIG. 3 is a generalized block diagram showing the major circuits to be used in accordance with the invention. These generalized circuits drive and are driven by transducers 37 and 38 and include an input module 50, a scale computer 51, an N generator circuit 52, an N counter circuit 53, a flow counter 54 and a display and/or control module 55.

The general purposes of these blocks follow, with a more detailed description of each block being given in connection with FIG. 4. The flow computer circuitry and structure of blocks 50 to 55 will be contained in housing 34 in FIG. 1, along with suitable power supplies and the like.

The basic purpose of input module 50 is to generate a "transmit signal" which is selectively applied to transducer 37 or 38 to generate the desired acoustic signal either in an upstream or downstream direction. As pointed out above, the effect of fluid flow 42 in pipe 31 of FIG. 2 will increase or reduce the transit time of the acoustical signal in the down and upstream directions, respectively. Input module 50 also receives and amplifies the signal received by the transducer which is not transmitting, and applies this received signal to the scale computer 51.

Scale computer 51 has several functions which will be later described in more detail. Generally, these functions are:

a. The recognition of a proper transducer return signal and the rejection of unwanted noise signals, such as the transducer transmit signal, which propagates through the pipe wall.

b. The recognition of a given point in the transducer return signal to measure the transmission time for the first pulse in a given direction in a series of N pulse cycles, and to serve as the standard for the remaining N pulses of the cycle in the same direction.

c. Circuits which automatically determine the refractive angle of sound transmission through the liquid to automatically compensate the readout for effects of different refraction angle in liquids having different sound velocities.

d. Circuits to adjust operation of the controls for varying pipe size and material so that all other modules are usable for all pipe sizes.

N generator 52 generally operates to serve the following functions:

a. The N generator produces the "N" pulses which start each counting cycle and each transmit signal.

b. A pulse counting circuit is provided to measure and memorize the pulse transmission time of a first N cycle and as the standard for the pulse transmission time of succeeding N pulses in a given up or down cycle sequence. This insures that all of a given group of up or down cycles are referred to the same point in the complex signal return pattern. This makes the system less sensitive to "jitter" or amplitude variation in the return signal caused by factors such as fluid turbulence and the like.

The N counter 53 operates to serve the following functions:

a. It provides circuitry to "start-up" the system by causing the generation of a transmit pulse if N pulses are not received from the N generator for a given length of time.

b. It provides input signals for the scale computer 51 needed to calculate the velocity of sound in the fluid and which adjusts the read cycle time to compensate for $v_s$ and the refraction angle of the particular fluid in pipe 31.

c. Circuits are provided to count the number of N cycles in a count cycle and to cause the number of count cycles per read cycle to fall within a given preferred range of between 128 and 512.

d. It contains many timing logic circuits for the system.

e. It contains the circuitry which switches the mode of operation of the system from a transmit upstream condition to a transmit downstream condition.

f. Timing delay circuits to delay the initiation of a next count-up, count-down or read cycle for a short delay period.

Flow counter 54 has the major purpose of accumulating clock pulses in an up-down counter by adding pulses during up cycles, and subtracting pulses during down cycles of a clock gate. Counter 54 has a storage register which receives the pulse residue of the up-down counter at the end of a read cycle. Pulses are accumulated in the storage register, for example, from 0.2 to 5 seconds and this stored reading is displayed to represent the average flow rate during the previous read cycle.

The output of the stored reading in flow counter 54 is applied to display 55, which indicates a constantly updated flow display at the end of each read cycle. Readings may also be accumulated in a totalizer 55a after being multiplied by elapsed time to give acount proportional to total flow in, for example, gallons. This total flow could be displayed typically in a six digit electromechanical counter.

A digital-to-analog converter 55b is provided to convert the flow signal to an analog d-c signal proportional to flow which can, in turn, be used for flow control purposes. This voltage output could also operate an analog display with a high - low alarm relay device.

Referring next to FIG. 4, all the components of FIG. 3 are shown in more detail. Thus, the input module 50 is shown within dotted lines 50c. Receiver-transmitter circuits 70 and 71 are connected to transducers 37 and 38 and circuits 70 and 71 are connected to a common transmit source 72 and phase correction circuit 73. Either transducer 37 or 38 can transmit a given pulse upon energization of transmit source 72 and proper gating of circuits 70 and 71. Circuit 70 is coupled to upstream transducer 37 (arbitrarily selected as the upstream device) and acts to receive sonic signals transmitted by transducer 38. Thus, circuit 70 is labeled RCVUP to indicate that it is the upstream receiver. In a similar manner, circuit 71 is the downstream receiver, labeled RCVDN and serves as the receiver for transducer 38. The transmit pulse $T_X$, applied to transducer 37 at time $t_1$ is shown in FIG. 5a. Input module 50 further contains an amplifier 74 having an automatically controllable gain which amplifies sonic signals received from transducers 37 and 38, these signals shown as $V_{SIG}$ in FIG. 4 and FIG. 5b. In FIG. 5b the first wave shape $V_{SIG}$ (PIPE) is the signal received by transducer 38, through the wall of pipe 31, following the transmit pulse $T_X$ from transducer 38, while the second wave shape is the sonic energy from transducer 38 which passed through the fluid in pipe 31.

Scale computer block 51 of FIG. 4 contains a transmit oscillator 80 which can be turned on at time $t_1$ by a signal $N_{T(1)}$ [FIG. 5c] to apply transmit power to transducer 37 or 38 through transmit control 81 which is used to shape the transmit wave shape.

Scale computer 51 further contains automatic level control circuit 82 (labeled ALC CONTROL) which adjusts the amplitude of the return signal from circuit 70 or 71 to above a given reference voltage and properly adjusts the gain of amplifiers 70, 71 and 74 to this end. The constant ALC level is shown in FIG. 5b as $V_{ALC}$. The output voltage $V_{SIG}$ of amplifier 74 is, therefore, normalized for any return from transducer 37 or 38.

Scale computer 51 next contains a comparator 83 which produces output pulses ZCO [FIG. 5d] at the first zero crossover point (ZCO) following a time when the amplitude of the normalized $V_{SIG}$ exceeds some small reference voltage. Thus, trains of pulses ZCO are produced by the voltage return, as shown in FIGS. 5b and 5d each time $V_{SIG}$ goes negative.

The normalized voltage $V_{SIG}$ is also applied to the ALC control 82, and acts to permit enabling of the ALC control only following the time the instantaneous voltage $V_{SIG}$ exceeds a given level, shown in FIG. 5b as $V_{TB}$.

The very first crossover above $V_{TB}$ creates the pulse $T_B$ of FIG. 5e at time $t_2$. This pulse — or its memorized equivalent, $T_E$ of FIg. 5f, which will be later described — represents a stable time delay after the previous transmit pulse $T_X$ which is reproducible for all succeeding receiving transducer signals in a given up or down group of cycles. The next N pulse, $N_{T(2)}$ [FIG. 5c], is generated at time $t_3$ by the zero crossover point at time $t_3$ which immediately follows the first $T_B$ (or $T_E$) pulse. This zero crossover, it should be noted, is accurate within about 0.1 nanoseconds, enabling precise measurement of the change in the timing of the zero crossover as influenced by fluid flow rate.

With the occurrence of pulse $T_B$ of FIG. 5e the circuit 84 produces a pulse $T_{BM}$ [FIG. 5g] which now fully enables ALC control 82. The ALC control remains enabled for only a short time beyond that for which the instantaneous amplitude of the peaks in signal $V_{SIG}$ is above the level $V_{TB}$. By enabling ALC control 82 only during this period, pipe noise will not falsely set gain levels of the various amplifiers. Moreover, the time from the transmission of the transmit pulse of FIG. 5a to receipt of a reproducibly identifiable point in the return signal is clearly marked at time $t_3$, coincident with the zero crossover which follows the first $T_B$ pulse of FIG. 5e [pulse ZCO (OPERATE) in FIG. 5d], or pulse $T_E$ in FIG. 5f.

Scale computer 51 further contains a circuit 85, labeled PINHB which prevents circuit operation by signals which are passed to the receiving transducer directly through the pipe wall and not through the fluid. Such a signal is shown in FIG. 5b as $V_{SIG}$ (PIPE). FIG. 5h shows the PINHB pulse produced by circuit 85 for inhibiting circuit 84 during this time.

Scale computer 51 finally contains a $T_R$ generator 86 which has the function of actually measuring the velocity of sound in the liquid medium from the pulses available from transducers 37 and 38 and then generating a time $T_R$ which is proportional to the calculated velocity of sound in the fluid. Any desired circuit may be used for this function. One specific circuit is described hereinafter in connection with FIG. 6.

Turning next to the N generator 52, there is provided a generator 90 of N pulses [FIG. 5c] which produces $N_T$ pulses which ultimately cause the generation of a transmit pulse. N generator 90 is initially enabled by a pulse from $T_E$ generator 91 just before the ZCO pulse ($T_B$) following crossover of the $T_B$ level.

A high frequency clocked pulse train is derived from clock 120 and is started with the beginning of the first $N_T$ of a given up/down count cycle pulse. This pulse train flows to the beginning of the $T_B$ pulse [FIG. 5d] and the number of $T_E$ pulses during this time interval are counted up in the $T_E$ count logic 92 and $T_E$ storage 93. In this way a measure of the time taken from the beginning of the transmit pulse to the first crossover of the signal voltage $V_{SIG}$ above the level $V_{TB}$ [FIG. 5b] is stored in storage 93.

In the next cycle the stored number of pulses in storage 93 is counted down to measure the time from the generation of the transmit pulse $N_{T(2)}$ to the depletion of the $T_E$ counter as shown in FIG. 5f. Thus, $T_E$ counter 94 operates in conjunction with logic 92 and storage 93 to generate a pulse from pulse generator 91 to enable the zero crossover following $T_E$ to generate the next N pulse. This same counting operation proceeds for all succeeding cycles in the up direction and then for all pulses of that set in the down direction. After a read cycle is completed, the time $T_E$ is then re-computed for the next pulse series from the first up pulse of that series.

The purpose of this novel $T_E$ count is to prevent relying on constant amplitude stability for $V_{SIG}$ from the ALC level circuit 82, which would be required to assure the same effective $T_B$ during each cycle. This is essential since each up and down count cycle must be measured relative to the same zero crossover.

The N counter 53 serves several functions and contains an automatic start circuit 100, a steering gate 101, and N pulse counter 102. There is also provided an N count programmer 103 and an N cycle counter 104. A clock gate generator 105 is also provided as is an up/down flip-flop 106. All of these components are controlled through a timing logic circuit 107. The N counter circuitry finally provides delay logic 108, end of cycle logic 109 and transmit up and transmit down, which actually determines not only transmit direction, but also receive direction for count up or count down operation in the flow counter.

Consider first the automatic start circuit 100. In the event that no N pulses appear for longer than a given time, for example, 5 milliseconds, the automatic start circuit generates a start pulse which is applied to timing logic circuit 107. The timing logic circuit will then generate a re-start pulse RSTT in FIG. 4 which is connected to the N generator 90 (in the N generator circuit 52). The N generator 90 then puts out a pulse $N_G$ which goes into steering gate 101.

Depending on the condition of steering gate 101, the pulse $N_G$ can go into one of two channels. The first channel is traveled by the pulse now named $N_T$ which first goes to the transmit oscillator 80 and transmit control 81 to cause the generation of a transmit pulse from the appropriate transducer 37 or 38. The pulses $N_T$ are also taken to pipe inhibit circuit 85 to inhibit the circuit 84 during the pipe return signal $V_{SIG}$ (PIPE) of FIG. 5b. Finally, pulses $N_T$ and a time signal from clock gate generator 105 are fed to the $T_R$ generator where they are used to read cycle time and to compensate for $v_s$ and refraction angle.

The number of $N_T$ pulses fed to steer gate 101 are counted by N counter 102 and, under the influence of the N count program 103 and following a predetermined number of N pulses in one direction, steer gate 101 is switched and the next pulse appears as pulse $R_N$ (the last received pulse of a given transmit-up or transmit-down group).

Pulse $R_N$ (last N pulse of up or down cycle) is applied to clock gate generator 105 to terminate counting and to the timing logic 107. The clock gate generator 105 switches the transmit direction of transducers 37 and 38 by applying a pulse to the up/down flip-flop 106 which has been clock-synchronized by signal CLGTS coming from flow counter 54. The fact that up/down flip-flop 106 has switched is announced to the timing logic 107 and to the N cycle counter 104 and end of cycle logic 109, which becomes effective if a $T_R$ pulse has been received.

Preferably, the total number of count cycles in a read cycle should be between 128 and 512 for the best error result. Thus, if more than 512 up-down cycles are used, error due to the uncertainty of the count of each cycle becomes predominant. If fewer than 128 up-down cycles are used, the error due to insufficient cycle averaging begins to predominate. The N count program monitors the number of N cycles which have ensued and later corrects the N cycle count, if necessary, to stay within the above desired range.

Timing logic 107 also controls delay logic circuit 108 to provide an intentional delay between the end of an up cycle and the beginning of the next down cycle. This is done to allow all transients to damp out before starting a new set of cycles with re-start provided by the RSTT pulse from timing logic circuit 107. This is necessary since N cycling was stopped by the steer gate 101 by converting $N_G$ to $R_N$ instead of a recycling $N_T$ pulse.

When the scale computer 51 generates $T_R$, the system is advised to stop cycling and prepare to readout flow. However, $T_R$, applied to end of cycle logic 109, merely tells the system to wait until the completion of the last needed down cycle of the read cycle in progress since the up and down cycles must be exactly equal in number. Also, arrival of $T_R$ changes the timing logic 107 to delay about 5 milliseconds before starting the next read cycle.

Instructions to readout flow are sent to the flow counter 54 in the form of an STRB signal from timing logic 107, followed by a clear (CLR) signal which starts the next cycle. The clear (CLR) signal resets all counters in the system to zero.

The flow counter 54 contains a clock pulse generator 120 (for example, a source of 15 megahertz pulses) which operates through a synchronizer 121 to accumulate pulses in up/down counter 122. Synchronizer 121 prevents truncation of the last pulse and counts only when gated by the clock gate generator 105. Thus, counter 122 counts up during up cycles, and is switched to count down and subtract during down cycles of the clock gate 105. At the end of the down cycle following $T_R$, the strobe signal STRB transfers the residue of counter 122 (related to flow in pipe 31) to storage register 123.

The quantity in storage register 123 is then transferred in BCD form to the digital display 124 as well as to the totalizer 125 and D/A converter 126.

Totalizer 125 is also connected to $T_R$ so that it can multiply flow rate and time to store a count proportional to total flow in, for example, gallons.

D/A converter 126 may be connected to an analog display 127 and generates signals $I_o$ and $V_o$ which are d-c signals proportional to flow and useful in automatic control systems. The display 127 can also operate a high/low flow level alarm.

FIG. 6 is a block diagram of one form which $T_R$ generator 86 could take, such that $T_R$ would be proportional to $v_s$ and inversely proportional to $T_L$.

In FIG. 6 the leading edge of $N_T$ generates a one-shot 140 whose length is $T_F$. $T_F$ is the total time in each $T_X$ interval that sound in the transducer coupling and pipe wall, and thus not in liquid. During the time $T_F$, gate 141 keeps a charging capacitor (not shown) in the $T_L$ generator 142 discharged. At the end of $T_F$, the capacitor is allowed to charge linearly for the balance of the $T_X$ interval. That is, the capacitor will charge over the time $T_L$. When the next N pulse starts, the voltage on the capacitor is proportional to $T_L$, and this is memorized in $T_L$ memory 143. Note that the new $T_E$ generated in one-shot 140 by the next $N_T$ will discharge the capacitor. Thus, the output voltage of $T_L$ memory 143 equals the value $T_L$.

A $1/T_L$ generator 144 inverts $T_L$ and produces an output current to a charging capacitor in the $T_R$ generator 145. Since the rate of change of voltage on the capacitor is proportional to the charging current, and the charging current is proportional to $1/T_L$, then the time required for the voltage on the capacitor in $T_R$ generator 145 to reach a desired fixed level is proportional to $1/T_L$ as desired. The capacitor in $T_R$ generator 145 is allowed to charge to a fixed level at which time a $T_R$ pulse is generated to initiate actuation of the readout operation.

Since it is known that for a low $v_s$ (that is, a high $T_L$) the refraction angle $\theta$ decreases in this condition, $T_F$ will increase. Therefore, a signal is fed through $T_F$ compute circuit 146 to $T_F$ 140 from $T_L$ memory 143 to vary $T_F$ as required.

Note that since $T_L$ and $T_R$ cannot be computed during non-counting time, clock gate not (CLGT) is applied to the circuit to prevent charging of both the $T_L$ and $T_R$ capacitors.

In the foregoing, the novel invention is described in connection with its application as a flowmeter. Other applications are possible, such as application of the circuit to a full level indicator. By way of example, the ALC control 82 of FIG. 4 can be connected to an indicating light (not shown), which is turned on if the ALC output is below a given level. This output would be obtained when the conduit or fluid container is empty since the signal return would be essentially zero.

Although this invention has been described with respect to its preferred embodiments, it should be understood that many variations and modifications will now be obvious to those skilled in the art, and it is preferred, therefore, that the scope of this invention be limited, not by the specific disclosure herein, but only by the appended claims.

The embodiments of the invention in which an exclusive privilege or property is claimed are defined as follows:

1. Ultrasonic detection apparatus for detecting a condition of a fluid in an enclosed elongated hollow conduit; said apparatus comprising first and second transducer means secured to the exterior surface of said conduit and being axially spaced from one another along the axis of said conduit; each of said first and second transducer means being adapted to transmit to the other, and receive from the other, ultrasonic energy pulses which pass through the fluid within said conduit; and circuit means connected to said first and second transducer means for measuring the difference in time taken for ultrasonic energy pulses to reach said first transducer means from said second transducer means and to reach said second transducer means from said first transducer means, and for producing an output related to said difference in time; and clock generator means for producing a train of output pulses having a given clock frequency and counter means connected to said clock generator means; said circuit means being connected to said counter means and controlling said counter means to count up pulses from said clock generator means during the time taken for said ultrasonic energy pulses to travel from said first transducer means to said second transducer means, said last-mentioned time defining an up cycle, and to count down pulses from said clock generator means during the time taken for said ultrasonic energy pulses to travel from said second transducer means to said first transducer means, said last-mentioned time defining a down cycle; said circuit means including a counting clock means for measuring time and which has a counting clock frequency $f_c$; said output related to said difference in time being related to the value F where $$F = mf_c (v_m/v_s) \sin \theta\, T_R$$

where
F is the digitized flow of fluid in said conduit in flow units,
m is a constant,
$v_m$ is the flow velocity of said fluid,
$v_s$ is the velocity of sound in said fluid,
$\theta$ is the angle of travel of said ultrasonic energy pulses to a normal to the pipe axis as the pulses travel through said fluid,
and $T_R$ is a function of $v_s$, $\theta$ and the internal diameter of said conduit;
and which further includes second circuit means connected to said first and second transducer means for determining the speed of sound in said fluid, and for adjusting the total number of times for counting the time taken for sound to traverse from said first to said second transducer means and from said second to said first transducer means proportionally with the velocity of sound in said fluid.

2. The detection apparatus of claim 1 wherein said first and second transducer means are mounted on the same side of said conduit, and wherein ultrasonic energy flowing between said first and second transducer means is reflected from the opposite interior surface of said conduit.

3. The detection apparatus of claim 2 wherein said angle of reflection to the normal of said interior surface is in the range between 29° and 51°.

4. The detection apparatus of claim 2 wherein said angle of reflection to the normal of said interior surface is about 48°.

5. The detection apparatus of claim 1 which further includes control circuit means for controlling the sequence of said up and down cycles, whereby a given number of up cycles are initiated, followed by a corresponding number of down cycles; said given number of up and down cycles defining a read cycle for producing said output which will be related to the residual count in said counter at the end of said read cycle.

6. The detection apparatus of claim 1, wherein said circuit means further includes receiver means for receiving said ultrasonic energy pulses to measure their time of transit upon the sensing of a given return signal condition, and gating means for gating said receiver means open when the instantaneous output signal level from said receiver means exceeds a given value; and wherein said circuit means further includes voltage zero detection means for measuring an instantaneous voltage zero in said return signal; said voltage zero detection means being connected to pulse transmission time measuring means for measuring the time from the transmission of said ultrasonic pulses to the occurrence of the first voltage zero of said received signal after gating open said receiver means.

7. The detection apparatus of claim 6 which further includes second counter means for counting the length of time taken from the time of transmission of a pulse to the time the corresponding received signal reaches said instantaneous level; said second counter means being connected to said gating means and gating said receiver means open and in readiness for receipt of a pulse related to the next instantaneous zero voltage level in the return signal following said last mentioned length of time for all up-down cycles in a read cycle following the first up cycle which establishes said last mentioned length of time.

8. Ultrasonic detection apparatus for detecting the flow of fluid in an elongated conduit; said apparatus comprising first and second transducer means spaced from one another in an axial direction of said conduit; each of said first and second transducer means being adapted to transmit to the other, and receive from the other, ultrasonic energy pulses which pass through the fluid within said conduit; and circuit means connected to said first and second transducer means for measuring the difference in time taken for ultrasonic energy to reach said first transducer means from aid second transducer means and to reach said second transducer means from said first transducer means, and for producing an output related to said difference in time; and clock generator means for producing a train of output pulses having a given clock frequency and counter means connected to said clock generator means; said circuit means being connected to said counter means and controlling said counter means to count up pulses from said clock generator means during the time taken for said ultrasonic energy pulses to travel from said first transducer means to said second transducer means, said last-mentioned time defining an up cycle, and to count down pulses from said clock generator means during the time taken for said ultrasonic energy pulses to travel from said second transducer means to said first transducer means, said last-mentioned time defining a down cycle; said circuit means including a counting clock means for measuring time and which has a counting clock frequency $f_c$; said output related to said difference in time being related to the value F where $$F = mf_c (v_m/v_s) \sin \theta \, T_R$$

where
 F is the digitized flow of fluid in said conduit in flow units,
 $m$ is a constant,
 $v_m$ is the flow velocity of said fluid,
 $v_s$ is the velocity of sound in said flud,
 $\theta$ is the angle of travel of said ultrasonic energy pulses to a normal to the pipe axis as the pulses travel through said fluid,
 and $T_R$ is a function of $v_s$, $\theta$ and the internal diameter of said conduit;
 and second circuit means connected to said first and second transducer means for determining the speed of sound in said fluid, and for adjusting the total number of times within a read cycle for counting the time taken for sound to traverse from said first to said second transducer means and from said second to said first transducer means proportionally with the velocity of sound in said fluid.

9. The detection apparatus of claim 8 wherein said first and second transducer means are mounted on the same side of said conduit, and wherein ultrasonic energy flowing between said first and second transducer means is reflected from the opposite interior surface of said conduit.

10. Ultrasonic detection apparatus for detecting the flow of fluid in an elongated conduit; said apparatus comprising first and second transducer means spaced from one another in an axial direction of said conduit; each of said first and second transducer means being adapted to transmit to the other, and receive from the other, ultrasonic energy pulses which pass through the fluid within said conduit; and circuit means connected to said first and second transducer means for measuring the difference in time taken for ultrasonic energy to reach said first transducer means from said second transducer means and to reach said second transducer means from said first transducer means, and for producing an output related to said difference in time; and clock generator means for producing a train of output pulses having a given clock frequency and counter means connected to said clock generator means; said circuit means being connected to said counter means and controlling said counter means to count up pulses from said clock generator means during the time taken for said ultrasonic energy pulses to travel from said first transducer means to said second transducer means, said last-mentioned time defining an up cycle, and to count down pulses from said clock generator means during the time taken for said ultrasonic energy pulses to travel from said second transducer means to said first transducer means, said last-mentioned time defining a down cycle; and including second circuit means connected to said first and second transducer means for determining the speed of sound in said fluid, and for adjusting the total number of times for counting the time taken for sound to traverse from said first to said second transducer means and from said second to said first transducer means proportionally with the velocity of sound in said fluid.

11. The detection apparatus of claim 10 which further includes control circuit means for controlling the sequence of up and down cycles, whereby a given number of up cycles are initiated, followed by a corresponding number of down cycles; said given number of up and down cycles defining a read cycle for producing said output which will be related to the residual count in said counter at the end of said read cycle.

12. Ultrasonic detection apparatus for detecting a condition of a fluid in an enclosed elongated hollow conduit; said apparatus comprising first and second transducer means secured to the exterior surface of said conduit and being axially spaced from one another along the axis of said conduit; each of said first and second transducer means being adapted to transmit to the other, and receive from the other, ultrasonic energy pulses which pass through the fluid within said conduit; and circuit means connected to said first and second transducer means for measuring the difference in time taken for ultrasonic energy pulses to reach said first transducer means from said second transducer means and to reach said second transducer means from said first transducer means, and for producing an output related to said difference in time; and clock generator means for producing a train of output pulses having a given clock frequency and counter means connected to said clock generator means; said circuit means being connected to said counter means and controlling said counter means to count up pulses from said clock generator means during the time taken for said ultrasonic energy pulses to travel from said first transducer means to said second transducer means, said last-mentioned time defining an up cycle, and to count down pulses from said clock generator means during the time taken for said ultrasonic energy pulses to travel from said second transducer means to said first transducer means, said last-mentioned time defining a down cycle; and control circuit means for controlling the sequence of said up and down cycles, whereby a given number of up cycles are initiated, followed by a corresponding number of down cycles; said given number of up and down cycles defining a read cycle for producing said output which will be related to the residual count in said counter at the end of said read cycle.

13. Ultrasonic detection apparatus for detecting a condition of a fluid in an enclosed elongated hollow conduit; said apparatus comprising first and second transducer means secured to the exterior surface of said conduit and being axially spaced from one another along the axis of said conduit; each of said first and second transducer means being adapted to transmit to the other, and receive from the other, ultrasonic energy pulses which pass through the fluid within said conduit; and circuit means connected to said first and second transducer means for measuring the difference in time taken for ultrasonic energy pulses to reach said first transducer means from said second transducer means and to reach said second transducer means from said first transducer means, and for producing an output related to said difference in time; and clock generator means for producing a train of output pulses having a given clock frequency and counter means connected to said clock generator means; said circuit means being connected to said counter means and controlling said counter means to count up pulses from said clock generator means during the time taken for said ultrasonic energy pulses to travel from said first transducer means to said second transducer means, said last-mentioned time defining an up cycle, and to count down pulses from said clock generator means during the time taken for said ultrasonic energy pulses to travel from said second transducer means to said first transducer means, said last-mentioned time defining a down cycle; and wherein said circuit means further includes receiver means for receiving said ultrasonic energy pulses to measure their time of transit upon the sensing of a given return signal condition, and gating means for gating said receiver means open when the instantaneous output signal level from said receiver means exceeds a given value; and wherein said circuit means further includes voltage zero detection means for measuring an instantaneous voltage zero in said return signal; said voltage zero detection means being connected to pulse transmission time measuring means for measuring the time from the transmission of said ultrasonic pulses to the occurrence of the first voltage zero of said received signal after gating open said receiver means.

* * * * *